United States Patent [19]
Carlsen, II

[11] 3,775,659
[45] Nov. 27, 1973

[54] BATTERY CHARGER
[75] Inventor: George David Carlsen, II, Playa Del Rey, Calif.
[73] Assignee: McCulloch Corporation, Los Angeles, Calif.
[22] Filed: June 9, 1971
[21] Appl. No.: 151,447

[52] U.S. Cl............................ 320/21, 320/39, 321/2
[51] Int. Cl. ............................................... H02j 7/10
[58] Field of Search ............................... 320/8, 2–6, 320/21, 61, DIG. 2, 39, 40; 322/2, 28; 321/2

[56] References Cited
UNITED STATES PATENTS
| | | | |
|---|---|---|---|
| 3,629,681 | 12/1971 | Gurwicz | 320/21 X |
| 3,384,806 | 5/1968 | Hartman | 322/28 X |
| 3,594,627 | 7/1971 | Lesher | 321/2 X |
| 3,597,673 | 8/1971 | Burkett | 320/21 X |
| 3,305,755 | 2/1967 | Walsh | 320/21 X |

Primary Examiner—J. D. Miller
Assistant Examiner—Robert J. Hickey
Attorney—Christie, Parker and Hale

[57] ABSTRACT

A battery charger for charging batteries that may have a nominal rated voltage equal to or greater than the voltage of the source, includes an accumulator of energy such as an inductor which is coupled across the source through a controllable switch for a first selected interval of time. The charger further includes a path between the accumulator of energy and the battery to be charged for the transfer of the stored energy to the battery. The path between the accumulator and the battery advantageously includes a unilateral impedance element having a recovery time such that a discharge path is provided for the battery during a second selected interval of time substantially less than the first selected interval of time.

6 Claims, 1 Drawing Figure

PATENTED NOV 27 1973
3,775,659
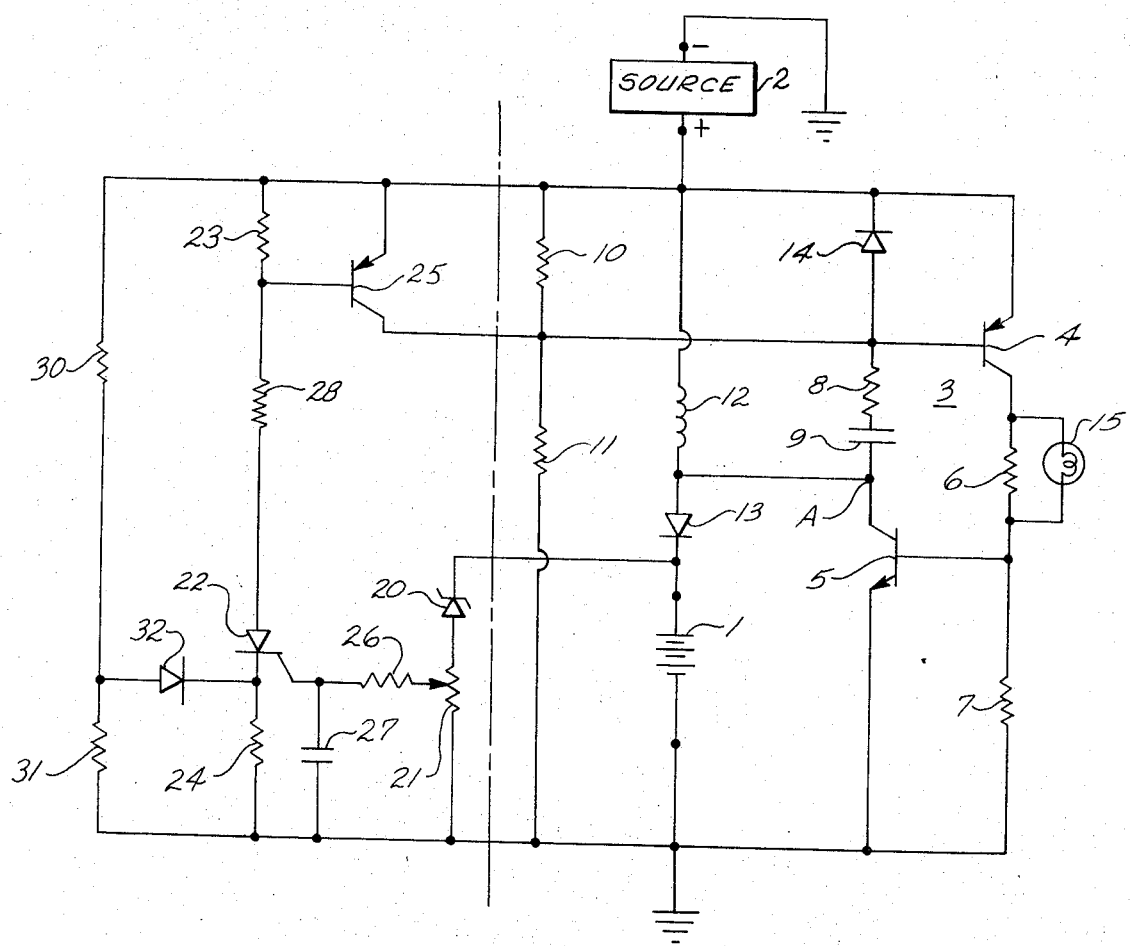
INVENTOR.
GEORGE DAVID CARLSEN, II
BY
ATTORNEYS

BATTERY CHARGER

CROSS REFERENCE TO RELATED APPLICATIONS

The invention herein is related to those disclosed and claimed in U. S. Pat. No. 3,517,293 issued June 23, 1970, copending U. S. application Ser. No. 867,838 filed Oct. 20, 1969, now U.S. Pat. No. 3,614,583, granted Oct. 19, 1971 and Ser. No. 844,469 filed July 24, 1969, now U.S. Pat. No. 3,609,502, granted Sept. 28, 1971 all of which are assigned to the same assignee as this application.

BACKGROUND OF THE INVENTION

1. Field of the Invention

This invention relates to a method and apparatus for charging batteries from a source that may have a terminal voltage equal to or less than the nominal rated voltage of the battery to be charged and also to the rapid charging of batteries from such a source.

With the increased use of batteries to power devices, the charging of the batteries has become more important. Often times the most desirable source of charging current is not immediately available and the batteries have to be charged from a less desirable source. For example, tape players may be carried to remote locations by automobile so that the only source of charging current available is the 12 volt automobile battery or the 12 volt generator of the automobile. However, in some cases the batteries powering the portable device such as a tape player have a nominal rated voltage of 12 volts or greater so that direct charging from the automobile battery is not possible. However, the ability to charge a battery from a lower voltage source is desirable. Moreover the rapid charging of a higher voltage battery from a lower voltage is desirable so that the battery powered device may be put back into service as soon as possible.

SUMMARY OF THE INVENTION

In accordance with the present invention, sources of charging current having voltages that may be lower than the voltage of the battery to be charged are advantageously employable to charge batteries. In particular it is possible to charge a battery having a nominal voltage rating that is equal to or greater than the voltage of the source by the method and apparatus of this invention. Additionally, the charger of this invention is light weight and compact and may be easily housed in the housing for the battery powered device, such as a tape player.

The charger capable of charging batteries having a nominal rated voltage which may be greater than the voltage of the source of charging current in accordance with this invention comprises an accumulator of energy or means for storing energy, such as an inductor, and a control circuitry for selectively coupling the accumulator to the source during a first selected interval of time. The control means of the charger further comprises means for coupling the accumulator to the battery to be charged so that the energy stored in the accumulator is transferred to the battery to charge the battery. The control circuit of the charger may be an oscillator having two active elements, one of which functions as a switch to connect the accumulator directly across the source in one mode of operation. In the second mode of operation the switch is open so that the accumulator is connected in series with the source and the series combination is connected to the battery to be charged and the stored energy is transferred to the battery. The storing of energy in the accumulator and the transferring of energy is repeated at a frequency determined by the components of the oscillator to progressively charge the battery. The charger may further advantageously include means for terminating the charging of the battery, which means comprises circuit means for monitoring the terminal voltage and circuit means responsive to the monitoring means for inhibiting the oscillator upon the attainment of a predetermined voltage at the terminals of the battery. Additionally, the charger may include an indicator light operable in response to the oscillator to indicate the application of charging current to the battery. The charger may further include circuit means for compensating for variations in the voltage of the source so that charging is terminated at a higher battery voltage for higher source voltages and at lower battery voltages for lower source voltages.

BRIEF DESCRIPTION OF THE DRAWINGS

The above and other features and advantages of the present invention may be understood more clearly and fully upon consideration of the following specification and drawing in which the single FIGURE is a schematic diagram of an apparatus for charging a battery from a source which may have a voltage below the nominal rated voltage of the battery to be charged in accordance with the present invention.

DESCRIPTION OF THE PREFERRED EMBODIMENT

An apparatus capable of charging a battery from a source which may have a voltage lower than the nominal rated voltage of the battery to be charged is schematically shown in the single FIGURE of the drawing. The apparatus of the drawing includes two parts separated by the dotted line. The portion of the apparatus to the right of the dotted line is used in charging the battery, while the portion to the left of the dotted line is employed to automatically terminate the charging of the battery upon the attainment of a predetermined value of battery terminal voltage.

The apparatus for charging a battery 1 from a source 2 includes an oscillator 3. The oscillator 3 has two active elements, a PNP transistor 4 and an NPN transistor 5. The emitter of transistor 4 is connected to the positive terminal of the source 2. The collector of transistor 4 is connected through a resistor 6 and a resistor 7 in series to the negative terminal of source 2. For purposes of illustration it is assumed that the negative terminal of source 2 is connected to ground reference. However, it is to be understood that the positive terminal of the source may be connected to ground reference or that neither terminal is connected to ground reference with direct connections then being made to the apparatus for charging the battery 1.

The oscillator 3 further includes a feedback network of a resistor 8 and a capacitor 9 connected in series between the base of transistor 4 and the collector of transistor 5. The oscillator 3 further includes a voltage divider network of a resistor 10 connected in series with a resistor 11 between the positive and negative terminals of the source 2 for providing bias for the transistor 4. For this purpose the base of transistor 4 is connected to the junction of resistors 10 and 11. As a further part of the oscillator 3, an inductor 12 is connected between the collector of transistor 5 and the positive terminal of source 2. The bottom terminal of inductor 12, which is connected to the collector of transistor 5, is also connected to the positive terminal of the battery 1 to be charged through a diode 13. The cathode of diode 13 is connected to the positive terminal of the battery 1 while the anode is connected to the inductor 12.

The apparatus further includes a diode 14 connected between the base of transistor 4 and the positive terminal of the source 2. The negative terminal of the battery 1 is connected to the negative terminal of the source 2, which connection is representatively shown by the connection to ground reference in the drawing.

In operation the inductor 12 functions as an accumulator of energy or a means for storing energy in the following manner. The voltage of source 2 is applied to the apparatus by some suitable means such as the closing of a switch (not shown) or the connecting of a line from the charger to an automobile battery, e.g., through a cigarette lighter outlet. In any event, upon the application of the voltage from the source 2, transistor 4 will be biased on by the appearance of a negative voltage at its base with respect to its emitter. The negative voltage at the base with respect to the emitter of transistor 4 is developed across resistor 10, which is in series with resistor 11 and together form a voltage divider across the source 2. Current flow through transistor 4 will pass through resistors 6 and 7 to bias on transistor 5. As current begins to flow through transistor 5, the series combination of relatively low resistance resistor 8 in series with capacitor 9 presents a relatively low resistance path in parallel with resistor 11 so that more voltage is dropped across resistor 10 to increase conduction through transistor 4. Sufficient bias is eventually provided by the conduction of current through transistor 4 and resistors 6 and 7 to drive transistor 5 into saturation. Thus, transistor 5 functions essentially as an electronic switch and point A, to which inductor 12, diode 13, capacitor 9, and the collector of transistor 5 are connected is held essentially at ground reference while transistor 5 is conducting.

During this time current will flow from the positive terminal of source 2 through inductor 12 to store energy in the magnetic field of inductor 12. There will be no current path through diode 13 to battery 1 during this interval of time because saturation of transistor 5 effectively short circuits this current path. Additionally, while ground reference appears at point A, diode 13 is back biased by the voltage of battery 1.

As current flows through resistor 10, resistor 8, capacitor 9, and transistor 5 from source 2, the voltage across capacitor 9 will increase. As the voltage builds up across capacitor 9, the base of transistor 4 becomes less negative with respect to its emitter. Eventually transistor 4 is biased off, which causes transistor 5 to be biased off to open the electronic switch. This removes the current path through the inductor 12, which inductor, because of its self-inductance, will try to keep the current flowing. Upon the cessation of current flow through inductor 12, the polarity of the voltage across the inductor will change and the voltage induced by the self-inductance will present a positive potential at point A. The voltage developed across inductor 12 will add to the voltage of source 2 such that the positive voltage at point A will be substantially in excess of the voltage of the battery 1. Diode 13 will thus be forward biased and the energy stored in inductor 12 will be transferred through diode 13 to the battery 1 to charge the battery. As the voltage of point A with respect to ground reference decreases below the voltage of the battery 1, the diode 13 will become back biased again. Capacitor 9 will during this time discharge through resistor 8, diode 14, and inductor 12. The magnetic field around inductor 12 will continue to collapse, inducing a voltage in the inductor, until transistor 5 is again turned on or the energy remaining in the inductor 12 after the back biasing of diode 13 is transferred to capacitor 9 and resistor 8. Upon the back biasing of diode 13, increased current will flow through resistors 10 and 11 to again bias transistor 4 on and the cycle will be repeated.

An indicator lamp 15 is connected across resistor 6 so that as the cycle repeats, the indicator lamp will be illuminated so that the operation of the apparatus may be visually monitored. The cycles may be repeated for a preselected interval of time or until one of the charge conditions of the battery attains a predetermined value.

Apparatus for monitoring one of the charge conditions, in particular the terminal voltage of the battery 1 being charged, is shown in the left hand portion of the drawing. The apparatus for terminating the charging of the battery 1 includes a means for monitoring the terminal voltage, which comprises a Zener diode 20 connected in series with a potentiometer 21 across the terminals of the battery 1. Circuit means responsive to the monitoring circuit means is also included in the apparatus for terminating the charging of the battery 1. This circuit means includes a silicon controlled rectifier 22 connected in series with a resistor 23, a resistor 28, and a resistor 24 between the positive and negative terminals of the source 2. Resistor 28 and resistor 23 are connected in series between the anode of rectifier 22 and the positive terminal of source 2 with one side of resistor 23 being connected to the positive source. Resistor 24 is connected between the cathode of rectifier 22 and the negative terminal of source 2. A transistor 25, which functions as an electronic switch under the control of silicon controlled rectifier 22, forms a part of the apparatus for terminating the charging of the battery 1. The emitter of transistor 25 is connected to the positive terminal of source 2, while the collector is connected to the base of transistor 4 so that the emitter collector path of transistor 25 is directly across the bias resistor 10 which controls the operation of transistor 4. The base of transistor 25 is connected to the junction of resistor 23 and resistor 28.

The operation of rectifier 22 is controlled by the voltage which appears between the movable arm of potentiometer 21 and ground reference, which voltage is representative of the terminal voltage of the battery 1. The gate of rectifier 22 is connected through a resistor 26 to the movable arm of potentiometer 21. A capacitor 27 is connected between the gate of rectifier 22 and the negative terminal of source 2 and cooperates with resistor 26 to form a filter circuit which bypasses unwanted voltage variations so that the apparatus for terminating the charging of the battery is responsive only to the terminal voltage of the battery and not some spurious voltages.

In operation the Zener diode 20 has a selected breakdown voltage whereby the terminal voltage of the battery 1 must be above a predetermined value before any current will flow through Zener diode 20 and potentiometer 21. Thereafter as the terminal voltage of the battery 1 increases, the voltage on the gate of rectifier 22 with respect to its cathode will increase until a predetermined value is reached. At this predetermined value, the rectifier 22 will be turned on and current flow through current limiting resistor 28 and resistor 23 will bias transistor 25 on. The turning on of transistor 25 will bypass resistor 10, thereby inhibiting the oscillator 3 by removing the bias for transistor 4 and the charging of the battery 1 is terminated.

The apparatus for charging a battery shown in the drawing includes a voltage compensation circuit to compensate for variations in source voltage. The compensation circuit includes resistor 30 connected in series with resistor 31, which series connection is connected between the positive and negative terminals of the source 2. A diode 32 is connected between the junction of resistors 30 and 31 and the cathode of silicon controlled rectifier 22. Thereafter as the voltage of the source 2 varies, the voltage at the cathode of silicon controlled rectifier 22 with respect to ground reference and the gate of rectifier 22 will vary. As the voltage of source 2 increases, the voltage at the cathode of rectifier 22 will increase and a higher voltage on the gate of the rectifier 22 will be required to turn this rectifier on. Thus, a higher terminal voltage across battery 1 will be required before charging is terminated.

The method of charging a battery in accordance with this invention from a source having a voltage which may be less than the nominal rated voltage of the battery to be charged comprises the steps of storing energy from a source in an accumulator of energy during a first interval of time, transferring a portion of the stored energy to the battery to be charged during a second interval of time, and repeating the steps to progressively charge the battery. The method may further include the step of discontinuing the cycles after a preselected interval of time, or automatically terminating the cycles in response to the attainment of a predetermined value of a battery condition. In particular the method may further comprise the steps of monitoring the terminal voltage of the battery and terminating the charging in response to the attainment of a predetermined value of terminal voltage. This method of charging a battery was accomplished by use of the apparatus of the drawing in one non-limiting example where the components of the apparatus had the following identification or values.

Battery 1 — 10 sub C cells having a rated capacity of 1 amp hour and a nominal rated voltage of 12 volts.
Source 2 — 12 volt automotive battery.
Transistor 4 — Motorola 2N4918.
Transistor 5 — Motorola 2N3771.
Resistor 6 — 16 ohms.
Resistor 7 — 12 ohms.
Resistor 8 — 132 ohms.
Capacitor 9 — 0.47 microfarad.
Resistor 10 — 1,000 ohms.
Resistor 11 — 10,000 ohms.
Inductor 12 — 115 microhenrys.
Diode 13 — Two Motorola 1N4001 (a pair are employed for economy reasons. A single one may be employed.)
Diode 14 — Motorola 1N914.
Indicator Lamp 15 — 3.2 volt, 160 milliamp bulb.

While employing these components in the apparatus of the drawing, the current through inductor 12 increased from 0 amperes to approximately 18 amperes while transistor 5 was in saturation. Upon the shutting off of transistor 5, the energy stored in inductor 12 was transferred to the 10 sub C cells of the battery 1 with a peak current of 10 amperes and an average current during the interval of time that current flowed into battery 1 of 4 amperes. This average charge current is thus approximately four times the nominal 1 hour rate of the cells of the battery. The nominal 1 hour rate in this application is defined as the nominal rate of the discharge current for one hour to a select end voltage such as one volt per cell, as established by the manufacturer of the cells. A type sub C cell is normally rated at 1 ampere hours and thus has a C rate or a nominal 1 hour rate of 1 ampere. An average charge current of 4 amperes, which is in excess of the nominal 1 hour rate of the cells of the battery, provides a high rate charge for the battery. Upon the decrease of the self-induced voltage of inductor 12 to back bias diode 13 and the turning on of transistor 5 at the end of the charge interval, a discharge pulse through diode 13 may selectively occur. This discharge pulse is a consequence of the recovery time of diode 13 and is believed to enhance the ability of the battery 1 to accept the high rate charge. While applying an average charge current of 4 amperes to the 10 sub C cell batteries and intermittently discharging through the diode 13, the battery 1 was charged to a selected state of charge in 15 minutes. The selected state of charge was substantially the rated capacity of the battery. The selected state of charge was determined by monitoring the terminal voltage of the battery 1. For the 12 volt battery, the terminal voltage was permitted to rise to 15.8 volts, at which point charging was automatically terminated.

The apparatus of the drawing is not limited to the charging of batteries from a source having a voltage equal to the nominal rated voltage of the batteries, but may advantageously be employed in charging batteries that have a nominal rated voltage substantially in excess of the voltage of the source. For example the apparatus has been employed to charge batteries having a nominal rated voltage of 15 volts when the source had a voltage of 12 volts and for charging batteries having a nominal rated voltage of 24 volts when the source had a voltage of 12 volts.

Various changes may be made in the details of construction without departing from the spirit and scope of the invention as defined by the appended claims.

What is claimed is:

1. An electrical circuit for charging a battery comprising a blocking diode;
   an inductor connectible in series with the diode between a voltage source and a battery to be charged, with the diode being connected on the battery side of the circuit and poled to block current flow from the battery into the circuit;
   a timing capacitor network connected across the inductor through a second blocking diode;
   an electronic switch having an ON-state and an OFF-state connected to provide when in its ON-state a charge current path therethrough for the capacitor of the timing capacitor network and a current path through the inductor from a source, while bypassing the battery; and
   a control circuit including the timing capacitor network and the inductor for alternately switching the electronic switch off and on.

2. An electrical circuit in accordance with claim 1 wherein the control circuit switches the electronic switch off upon the capacitor attaining a preselected voltage.

3. An electrical circuit in accordance with claim 1 wherein the control circuit switches the electronic switch on when the second blocking diode becomes reverse biased.

4. Apparatus for charging a battery from a source comprising an NPN transistor, a PNP transistor, an inductor connected in series with the collector emitter path of the NPN transistor between the positive and negative terminal of the source, the inductor being connected between the collector of the NPN transistor and the positive terminal of the source, a first resistor connected between the collector of the PNP transistor and the base of the NPN transistor, means for connecting the emitter of the PNP transistor to the positive terminal of the source, a second resistor connected between the base of the NPN transistor and the negative terminal of the source, a voltage divider of a third and fourth resistor connected between the positive and negative terminals of the source, the base of the PNP transistor being connected to the junction of the third and fourth resistor, a fifth resistor and a capacitor connected in series between the base of the PNP transistor and the collector of the NPN transistor, a first diode connected between the collector of the NPN transistor and the positive terminal of the battery to be charged, a second diode connected between the base of the PNP transistor and the positive terminal of the source and means for connecting the negative terminal of the battery to be charged to the negative terminal of the source.

5. Apparatus in accordance with claim 4 further including a second PNP transistor having its emitter connected to the positive terminal of the source and its collector connected to the base of the first PNP transistor, a sixth resistor connected between the base of the second PNP transistor and the positive terminal of the source, a silicon controlled rectifier, a seventh resistor, the anode of the rectifier being connected to the base of the second PNP transistor through the seventh resistor, an eighth resistor being connected between the cathode of the rectifier and the negative terminal of the source, a Zener diode and a potentiometer connected in series between the positive and negative terminals of the battery to be charged, a ninth resistor being connected between the gate electrode of the rectifier and the movable arm of the potentiometer and a capacitor being connected between the gate electrode of the rectifier and the negative terminal of the source.

6. Apparatus in accordance with claim 5 further including a tenth resistor and an eleventh resistor connected in series between the positive and negative terminal of the source and a third diode connected between the junction of the tenth and eleventh resistors and the cathode of the rectifier.

* * * * *